B. B. KINKADE.
SOIL PIPE TESTING PLUG.
APPLICATION FILED MAY 31, 1910.
986,297.
Patented Mar. 7, 1911.
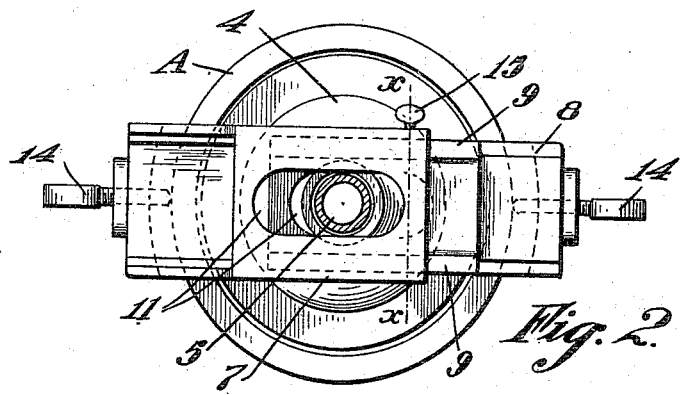
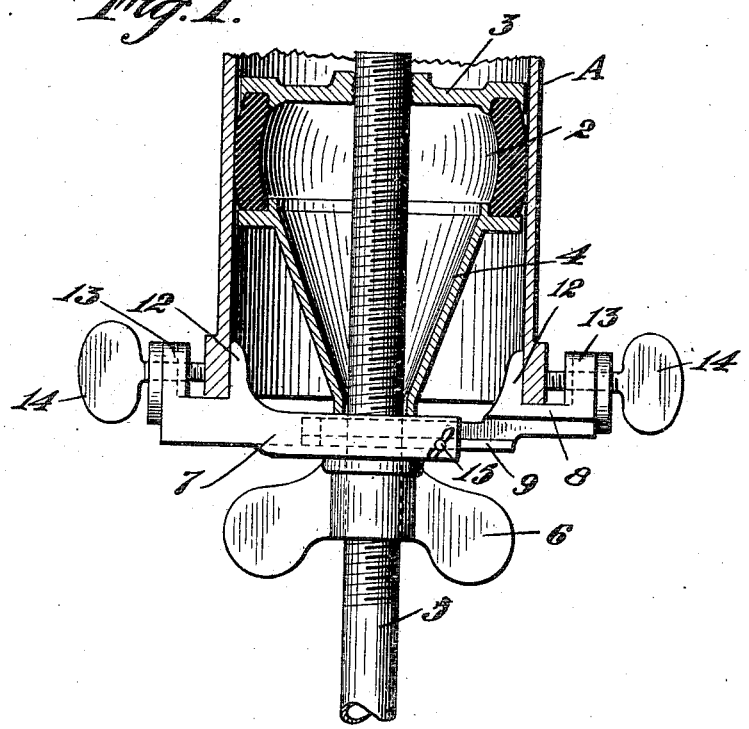
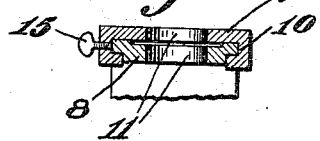
Witnesses:
R. S. Berry
F. E. Maynard
Inventor:
Bryant B. Kinkade
By G. H. Strong
His Attorney.

UNITED STATES PATENT OFFICE.

BRYANT B. KINKADE, OF BERKELEY, CALIFORNIA.

SOIL-PIPE-TESTING PLUG.

986,297. Specification of Letters Patent. Patented Mar. 7, 1911.

Application filed May 31, 1910. Serial No. 564,027.

*To all whom it may concern:*

Be it known that I, BRYANT B. KINKADE, citizen of the United States, residing at Berkeley, in the county of Alameda and State of California, have invented new and useful Improvements in Soil-Pipe-Testing Plugs, of which the following is a specification.

This invention relates to an improved testing plug support, such as is employed in conjunction with testing plugs used in temporarily closing the open ends of soil pipes and the like, so that water under pressure may be delivered to the interior of the pipe line so as to test the work and determine if it is defective or not.

The plug usually consists of an expansible rubber tube which is inserted in the end of the pipe and expanded so as to tightly contact the inner wall of the pipe and effectively prevent the escape of the water under pressure. The pressure of the water behind the plug has a tendency to force it out of the soil pipe as the plug only depends upon the amount of its expansion and consequent frictional contact with the inner surface of the pipe, to hold it in position.

The object of my invention is to provide means by which the plug may be clamped and held securely in tight contact with the smooth inside of the pipe so as to insure the plug remaining in position during the test.

The invention consists of the parts and the construction and combination of parts as hereinafter more fully described and claimed, having reference to the accompanying drawings, in which—

Figure 1 is a vertical section of a soil pipe and plug, showing the invention as applied. Fig. 2 is a plan view. Fig. 3 is a cross section on the line X—X, Fig. 2.

In the drawings, A represents the end of an ordinary soil pipe or the like having a smooth interior surface.

2 is an expansible rubber tube of the common soil pipe plug which is mounted between a disk 3 and the horizontally flanged portion of a conical sleeve 4. A water supply pipe 5, threaded for some distance of its length, extends axially through the sleeve 4 and the disk 3, and is screwed into the latter, as shown in Fig. 1. A wing nut 6 screwed on the pipe 5 outside the sleeve 4 in the ordinary plug is adapted to be screwed upon the sleeve 4 so as to draw the disk 3 and tube 4 toward each other and thus compress the plug 2 and thereby expand it against the interior of the pipe A.

This invention resides in interposing an adjustable and extensible clamp member between the outer end of the sleeve 4 and the wing nut 6, and securing the clamp to the end of the pipe 5 in such manner as to prevent the plug being forced outward by the pressure of water behind the disk 3. This clamp member comprises two plates 7—8, one of which telescopes and is slidable upon the other, the plate 8 having side flanges 9 which ride in grooves 10 formed in the plate 7. Both plates 7—8 are provided with an elongated slot 11, through which the threaded water pipe 5 may extend, and each plate 7—8 has formed on its outer end upwardly projecting flanges 12—13, which are so disposed that the end of the pipe A may extend between the flanges 12—13, the latter extending upward on the outside of the pipe and the former extending upward on the inside of the pipe. Set screws 14 are threaded in the flanges 12 and are adapted to be screwed against the outside of the pipe A and clamp its edge between the flanges 12—13, as shown in Fig. 1.

The operation of the invention is as follows: The cone sleeve 4, the resilient or expansible plug 2, and the disk or plate 3 are assembled and inserted into the pipe A. The plates 7—8 are then adjusted on each other so that the flanges 12—13 will engage the end of the pipe, and the thumb screws 14 are tightened so as to draw the flanges 13 against the inner surface of the pipe A and thus clamp the plates 7—8 thereon. The wing nut 6 is then screwed upon the pipe 5, thus drawing the disk 3 and sleeve 4 toward each other and compressing the expansible plug 2 to make a sufficiently tight fit and seal. A thumb screw 15 threaded in the plate 7 is adapted to be tightened against the plate 8, so as temporarily to hold the plates 7—8 together when the proper adjustment is obtained. By constructing the plates 7—8 so as to be slidable upon each other, the clamp can be readily fitted on pipes and with plugs of the various diameters which occur in the use of such apparatus. The slot or channel formed between the flanges 12—13 is preferably formed on an arc of a circle so that the contacting faces of the flanges will approximately conform to the curved surfaces of the pipe A and prevent breakage or distortion.

Having thus described my invention, what I claim and desire to secure by Letters-Patent, is:—

1. The combination in a testing device for pipes, of an expansible plug adapted to enter the end of the pipe, metal disks between which the plug is located, a screw threaded element, and a wing nut turnable thereon, telescopically slidable plates supporting one compressing member, and against the opposite side of which the nut abuts to actuate the other compressing member, said plates having upturned flanges adapted to grip the lower end of the pipe to be tested, and locking screws therefor.

2. The combination with an expansible testing plug for pipes, of exterior supporting plates having upturned clamping flanges and screws by which the flanges may be secured to the pipe end, said plates being slidably adjustable to fit pipes of different sizes and centrally slotted for the passage of a screw-threaded member, and plug expanding disks with which the screw-threaded member connects.

In testimony whereof I have hereunto set my hand in the presence of two subscribing witnesses.

BRYANT B. KINKADE.

Witnesses:
CHARLES EDELMAN,
C. C. COOK.

---

Copies of this patent may be obtained for five cents each, by addressing the "Commissioner of Patents, Washington, D. C."